(12) United States Patent
Ma et al.

(10) Patent No.: US 7,380,525 B2
(45) Date of Patent: Jun. 3, 2008

(54) METHOD OF OPERATING AN INTERNAL COMBUSTION ENGINE

(75) Inventors: Thomas Tsoi-Hei Ma, Essex (GB); Hua Zhao, Buckinghamshire (GB)

(73) Assignee: Brunel University, Uxbridge, Middlesex (GB)

( * ) Notice: Subject to any disclaimer, the term of this patent is extended or adjusted under 35 U.S.C. 154(b) by 0 days.

(21) Appl. No.: 11/569,281

(22) PCT Filed: May 17, 2005

(86) PCT No.: PCT/GB2005/050068

§ 371 (c)(1),
(2), (4) Date: Feb. 27, 2007

(87) PCT Pub. No.: WO2005/113947

PCT Pub. Date: Dec. 1, 2005

(65) Prior Publication Data

US 2007/0246006 A1    Oct. 25, 2007

(30) Foreign Application Priority Data

May 21, 2004  (GB) ................. 0411359.3
Jul. 9, 2004   (GB) ................. 0415421.7

(51) Int. Cl.
*F01L 13/08* (2006.01)
*F01L 13/02* (2006.01)
*F02B 31/00* (2006.01)

(52) U.S. Cl. .................... 123/48 D; 123/78 D; 123/308

(58) Field of Classification Search ............... 123/48 D, 123/78 D, 308

See application file for complete search history.

(56) References Cited

U.S. PATENT DOCUMENTS

| 2003/0116124 A1* | 6/2003 | Lawrence et al. ........... 123/305 |
| 2004/0065297 A1* | 4/2004 | Sakai et al. ................. 123/308 |

FOREIGN PATENT DOCUMENTS

| EP | 0095252    | 11/1983 |
| EP | 1063427    | 12/2000 |
| JP | 2002339768 | 11/2002 |
| JP | 2003049682 | 2/2003  |
| JP | 60116822   | 2/2007  |

* cited by examiner

*Primary Examiner*—Stephen K. Cronin
*Assistant Examiner*—Arnold Castro
(74) *Attorney, Agent, or Firm*—Smith-Hill and Bedell

(57) ABSTRACT

A method is disclosed for operating an internal combustion engine of the type having an engine cylinder with a reciprocating piston, first and second intake ports for admitting gas from an ambient air supply into the engine cylinder, first and second intake valves each arranged between a respective one of the intake ports and the engine cylinder, a non-return valve arranged in the second of the intake ports at a distance from the second intake valve and oriented to allow gas to flow only towards the engine cylinder, and a variable valve actuating system for controlling the opening and closing of at least the second intake valve. In the method of the invention, in at least one operating mode of the engine, the second intake valve is opened and closed, while the cylinder is fully isolated from the ambient air, to permit gas transfer between the cylinder and an auxiliary chamber temporarily defined by the part of the second intake port lying between the second intake valve and the non-return valve. The second intake valve is opened at a time when the pressure in the auxiliary chamber is greater than the pressure of the ambient air supply such that no gas escapes past the non-return valve.

10 Claims, 2 Drawing Sheets dual intake mode variable comp ratio air compressor mode crank-fire cycle mode

METHOD OF OPERATING AN INTERNAL COMBUSTION ENGINE

This is a national stage application filed under 35 USC 371 based on International Application No. PCT/GB2005/050068 filed May 17, 2005, and claims priority under 35 USC 119 of United Kingdom Patent Application No. 0411359.3 filed May 21, 2004 and United Kingdom Patent Application No. 0415421.7 filed Jul. 9, 2004.

FIELD OF THE INVENTION

The present invention relates to a method of operating an internal combustion engine.

BACKGROUND OF THE INVENTION

It is known to provide an auxiliary chamber which is connected and disconnected with an engine cylinder during the compression or expansion period of the engine cycle in order to influence the compression or expansion process. EP0095252 proposes using such an auxiliary chamber to trap a variable fraction of the cylinder charge during compression in order to vary the effective compression ratio of the engine. Pending patent application PCT/GB2004/001018 proposes using an auxiliary chamber as a buffer chamber in an air hybrid engine vehicle to transfer compressed gases in two steps via the auxiliary chamber to a compressed gas reservoir when the engine is operating as a gas compressor thereby assisting deceleration of the vehicle, and to expand the compressed gases in two steps from the compressed gas reservoir via the auxiliary chamber when the engine is operated as a gas expander thereby assisting acceleration of the vehicle. Another pending patent application GB0405828.5 proposes using an auxiliary chamber to vary the compression temperature of the cylinder charge in order to achieve CAI/HCCI combustion and influence the auto-ignition timing.

In order to apply the above proposed concepts, it has hitherto been necessary to provide a dedicated auxiliary chamber and a dedicated control valve connecting with the engine cylinder at the appropriate timing in order to vary the internal gas transfer. Such a system however adds cost and complexity, and is difficult to install in the limited space of the combustion chamber of the engine.

SUMMARY OF THE INVENTION

According to the present invention, there is provided a method of operating an internal combustion engine having an engine cylinder with a reciprocating piston, first and second intake ports for admitting gas from an ambient air supply into the engine cylinder, first and second intake valves each arranged between a respective one of the intake ports and the engine cylinder, a non-return valve arranged in the second of the intake ports at a distance from the second intake valve and oriented to allow gas to flow only towards the engine cylinder, and a variable valve actuating system for controlling the opening and closing of at least the second intake valve, the method being characterised in that, in at least one operating mode of the engine, the second intake valve is opened and closed, while the cylinder is fully isolated from the ambient air, to permit gas transfer between the cylinder and an auxiliary chamber temporarily defined by the part of the second intake port lying between the second intake valve and the non-return valve, the second intake valve being opened at a time when the pressure in the auxiliary chamber is greater than the pressure of the ambient air supply such that no gas escapes past the non-return valve.

Engines are already known in which a non-return valve is arranged upstream of an intake valve in order to improve the breathing of the engine. The present invention is based on the realisation that the closed chamber temporarily defined between the intake valve and the non return valve can serve the same function as the auxiliary chambers required in the previously mentioned prior art references for internal gas exchange.

It should be noted that when the intake valves are normally timed to open and close during the ambient air intake period of the engine cycle, the non-return valve in the second intake port will be subjected to a suction pressure from the engine cylinder and will automatically open to permit through flow of ambient air in the direction towards the engine cylinder. On the other hand, when internal gas transfer is required and the opening and closing timings of the intake valves are altered to briefly connect the second intake port to a local pressure higher than the intake pressure from the ambient air, the second intake port will cease to function as an ambient air flow port but the engine could still operate with air supplied through the first intake port so that there is no significant adverse effect on the running of the engine other than a possible reduction in the volumetric efficiency of the engine.

In the invention, by transforming the end portion of the second intake port into a temporary auxiliary chamber, no extra space is required in the combustion chamber to include this provision, and there will be cost saving in not duplicating the connecting valve and the associated valve actuation system necessary for the control of a separate auxiliary chamber, by making use of the existing intake valve and its valve actuation system.

The non-return valve is preferably a reed valve mounted in the second intake port for isolating the temporary auxiliary chamber.

In one application of the present invention, the engine can be made to operate as a variable compression ratio engine by following the method steps of briefly connecting the temporary auxiliary chamber with the engine cylinder by moving the opening and closing timings of the second intake valve to a period after the beginning of the compression period of the engine cycle thereby trapping a variable fraction of the compressed charge in the auxiliary chamber in order to vary the effective compression ratio of the engine.

The provision of the above auxiliary chamber makes it possible to apply the proposal described in EP0095252 for a variable compression ratio engine. Furthermore, by varying the effective compression ratio, the method may be used in accordance with the proposal described in GB0405828.5 for varying the compression temperature of the cylinder charge in order to achieve CAI/HCCI combustion and influence the auto-ignition timing.

In another application, the engine can be made to operate as an air compressor for absorbing power during vehicle deceleration in a non-firing cycle in the absence of fuel by following the method steps of briefly connecting the said temporary auxiliary chamber with the engine cylinder by moving the opening and closing timings of the second intake valve to a period before the end of the compression period of the engine cycle thereby trapping some compressed air in the auxiliary chamber, followed by briefly connecting the then sealed auxiliary chamber with an external pressurised air reservoir by way of a timed on/off valve provided between the said auxiliary chamber and the said pressurised air reservoir thereby transferring some of the compressed air into the air reservoir.

The provision of the above further connection of the then sealed auxiliary chamber via an on/off valve to an external pressurised air reservoir makes it possible to apply the proposal described in PCT/GB2004/001018 for an air hybrid engine serving at times during vehicle deceleration as an air compressor for absorbing power from the reciprocating pistons. In this case, the method of the present invention will trap some compressed air in the temporary auxiliary chamber during the late compression period of the engine cycle, and the trapped air is subsequently released into an external pressurised air reservoir during the remaining period of the engine cycle thereby storing some of the compressed air energy in the pressurised air reservoir.

The stored compressed air may later be re-used in the air hybrid engine in a variety of ways, such as cranking and re-starting the engine during stop-start operation, boosting the engine with a quick burst of pressurised air during acceleration in order to reduce the response delay from a turbo-charger, injecting secondary air into the engine exhaust for fast catalyst light off and particulate trap regeneration, and motoring the engine under certain cruising conditions.

In particular, in yet another application, the method of the present invention may be applied in a special combined "crank-fire" cycle for cranking and firing the engine during stop-start operation using the compressed air stored in the external pressurised air reservoir. In this case, the opening and closing timings of the first and second intake valves are altered in such a way as to isolate the engine cylinder from the ambient air supply by not opening the first intake valve at all (by means of a variable valve actuation system which de-activates the valve), whilst the second intake valve is opened and closed normally during the intake period of the engine cycle with the second intake port also connected to the external pressurised air reservoir by opening the timed on/off valve. During the above crank fire cycle, the non return valve in the second intake port will remain shut because of the air pressure from the external air reservoir and compressed air will enter the cylinder during the intake period and at the same time drive the piston at high pressure thus producing motoring power for cranking the engine. The same air is then compressed in the immediately following compression period and fired with fuel thus producing further combustion power. This would accelerate the engine very rapidly with two torque pulses in the same cycle.

By connecting a whole bank of engine cylinders to a common external pressurised air reservoir according to the above method, the crank-fire cycle will automatically synchronise with the firing sequence of the cylinders, rotating the crankshaft and re-starting the engine instantaneously within just one or two crankshaft revolutions. Once the engine has started, the compressed air from the external air reservoir is switched off and the engine will transition smoothly and naturally to the normal firing mode with the non-return valve in the second intake port now opening automatically for drawing ambient air through the port in the subsequent cycles, followed by re-activation the first intake valve. Thus the crank-fire cycle according to internal gas transfer method of the present invention is a very effective process for stop-start operation in an air hybrid engine.

The above crank fire cycle may also be used, during driving, acceleration and quick launch of a vehicle, to supercharge the engine with very high boost of many bars compressed air pressure, albeit for only a brief period of time, producing very high torque in excess of the instantaneous torque normally expected from boosting by a turbocharger, thus eliminating the response delay and exhaust smoke problems caused by turbo-lag.

Of course, the engine may at any time be switched to operate with two through-flow intake ports for maximum volumetric efficiency by moving the opening and closing timings of both the first and second intake valves to the ambient air intake period of the engine cycle.

In the foregoing applications of the present invention, a variable valve actuation system is used to alter the opening and closing timings of the first and second intake valves. This could be a fully flexible variable valve actuation system of the camless type using electro-hydraulic or electromagnetic actuators, but such systems are currently still under prototype development and are complicated and expensive. It is therefore an advantage of the invention that it can also be implemented using much simpler and proven cam actuated systems such as variable camshaft timing (VCT), variable valve lift and duration (VVLD), cam profile switching (CPS) and valve de-activation (de-act), all of which are rapidly becoming standard features in volume production engines.

For quick reference, VCT is achieved by a variable phaser timing pulley driving the camshaft examples of which could be found in many engines such as Ford®, General Motors® and Toyota®, VVLD is achieved by a variable geometry rocker example of which could be found in BMW® engines, CPS is achieved by selective engagement of a cam follower with one of two available fixed cam profiles on a common camshaft example of which could be found in Honda® engines, and valve de-activation is achieved by a latching mechanism with lost motion developed by Eaton Corp for variable displacement engines.

By choosing the most economical variable valve actuation system according to need for different engine applications using the internal gas transfer method of the present invention, a highly effective and reliable package could be produced for each application. For example, a variable compression ratio engine using a temporary auxiliary chamber created by the present invention may be controlled by VVLD with small valve lift and narrow valve duration in combination with VCT acting on the second intake valve. In another example, a low-cost air hybrid engine using a temporary auxiliary chamber may be switched between firing mode and compressor mode by VCT or CPS acting on the second intake valve, and also switched to the crank-fire cycle mode during stop-start by valve de-activation acting on the first intake valve. Moreover, another VCT or CPS system acting on the first intake valve may be included in this engine for enhancing high speed performance as used conventionally for this purpose.

In the above examples, production-proven VCT, VVLD, CPS or de-act hardware are used to achieve extra functionality of variable compression ratio, HCCI/CAI combustion control, and air hybrid operation. This would make the internal gas exchange method of the present invention highly practical, requiring relatively small development effort to realise the potential.

BRIEF DESCRIPTION OF THE DRAWING

The invention will now be described further, by way of example, with reference to the accompanying drawings in which.

DETAILED DESCRIPTION OF THE PREFERRED EMBODIMENT

Figure 1:
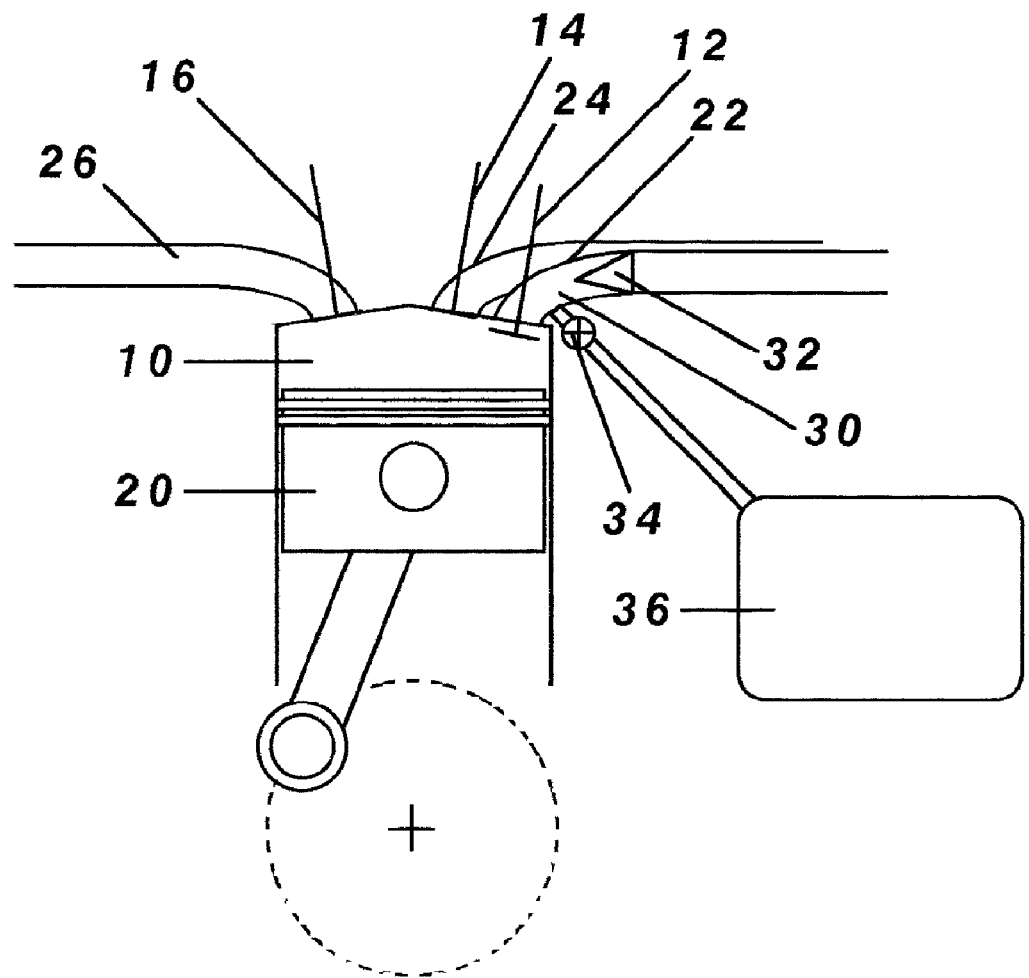
FIG. 1 shows a schematic view of an internal combustion engine with first and second intake ports and with the second intake port having a non-return valve, used in the internal gas transfer method of the present invention.

FIG. 1 shows an internal combustion engine having a first and a second intake port 24, 22 working in conjunction with an exhaust port 26 in each cylinder in which each port is controlled by an associated poppet valve 14, 12, 16 timed to open and close during the intake or exhaust period of the engine cycle in order to control the breathing of the engine. A non return reed valve 32 is additionally provided in the second intake port 22 positioned such that the valve 32 automatically shuts in the flow direction away from the engine cylinder 10 when the port 22 and the non-return valve 32 are subjected to a local pressure higher than the delivery pressure from the ambient air. The engine also includes a fuel system and an ignition system which are not shown.

In the above engine, a variable valve actuation system (not shown) is provided for the intake valves 12, 14. This could be fully flexible and variable as in an electronically controlled camless valve actuation system using electro-hydraulic or electric-magnetic actuators. However, there is no need to go to such complexity and the present invention may be achieved using simpler, volume production, camshaft actuated variable valve systems such as VCT, VVLD, CPS and valve de-activation.

The second intake valve 12 is normally timed to open and close during the ambient air intake period of the engine cycle during which the non-return valve 32 is subjected to a suction pressure from the engine cylinder 10 and will automatically open to permit through-flow of air in the flow direction towards the engine cylinder 10. When internal gas transfer is required with the cylinder 10 isolated from the ambient air supply, the second intake valve 12 may be moved in timing to open and close during the compression period of the engine cycle, thus subjecting the second intake port 22 and the non-return valve 32 to a local pressure higher than the delivery pressure from the ambient air, whereupon the non-return valve 32 automatically shuts and isolates the end portion of the second intake port 22 to form a temporary auxiliary chamber 30, and internal gas transfer can take place between the auxiliary chamber 30 and the engine cylinder 10.

The non-return reed valve 32 is designed to have fast response and good sealing against high pressure within the temporary auxiliary chamber 30. It is also designed to permit a high through-flow when there is a suction pressure in the intake port 22.

In FIG. 1, the engine is shown at a time when the engine cycle is undergoing compression with the intake valve 14 and the exhaust valve 16 in the closed position. On the other hand, the intake valve 12 of the port 22 is shown at this time in the open position, connecting the temporary auxiliary chamber 30 with the engine cylinder 10 and permitting gas transfer internally between the auxiliary chamber 30 and the engine cylinder 10.

It should be noted that in the above case, the second intake port 22 will cease to function as an ambient air flow port during the intake period of the engine cycle but the engine will continue to operate with the first intake port 24 and its associated intake valve 14 fully functional as an ambient air flow port so that there is no significant adverse effect in the running of the engine other than a possible reduction in the volumetric efficiency of the engine.

The internal gas transfer method of the present invention may be used to influence the power conversion process of the engine in a variety of ways described in the following with several examples shown in FIGS. 2b, 2c, 2d.

In a first example according to the proposal described in EP0095252, the engine can be made to operate as a variable compression ratio engine by following the method steps of briefly connecting the temporary auxiliary chamber 30 with the engine cylinder 10 by moving the opening and closing timings of the second intake valve 12 to a period after the beginning of the compression period of the engine cycle thereby trapping a variable fraction of the compressed charge in the auxiliary chamber 30 in order to vary the effective compression ratio of the engine. A production-proven VVLD valve actuation system in combination with VCT acting on the second intake valve 12 may be used to achieve this as illustrated in FIG. 2b.

The above variable compression ratio engine may then be used according to the proposal described in GB0405828.5 for varying the compression temperature of the cylinder charge in order to achieve CAI/HCCI combustion and influence the auto-ignition timing.

In a second example, the engine can be made to operate as an air compressor for absorbing power during deceleration in a non-firing cycle in the absence of fuel by following the method steps of briefly connecting the temporary auxiliary chamber 30 with the engine cylinder 10 by moving the opening and closing timings of the second intake valve 12 to a period before the end of the compression period of the engine cycle thereby trapping some compressed air in the auxiliary chamber 30, followed by briefly connecting the then sealed auxiliary chamber 30 with an external pressurised air reservoir 36 by way of a timed on/off valve 34 provided between the auxiliary chamber 30 and the pressurised air reservoir 36 thereby transferring some of the compressed air into the air reservoir 36. A production proven VCT or CPS valve actuation system acting on the second intake valve 12 may be used to achieve this as illustrated in FIG. 2c.

The provision of the above further connection of the then sealed auxiliary chamber 30 via an on/off valve 34 to an external pressurised air reservoir 36 makes it possible to apply the proposal described in PCT/GB2004/001018 for an air hybrid engine serving at times during deceleration as an air compressor for absorbing power from the reciprocating pistons. In this case, the internal gas transfer method of the present invention will trap some compressed air into the temporary auxiliary chamber 30 during the late compression period of the engine cycle, and the trapped air is subsequently released into an external pressurised air reservoir 36 during the remaining period of the engine cycle thereby storing some of the compressed air energy in the pressurised air reservoir 36.

The stored compressed air may later be re-used in the air hybrid engine in a variety of ways, such as cranking and re-starting the engine during stop-start operation, boosting the engine with a quick burst of pressurised air during acceleration for reducing the response delay from a turbocharger, injecting secondary air into the engine exhaust for fast catalyst light-off and particulate trap regeneration, and motoring the engine under certain cruising conditions.

In particular, in a third example, the internal gas exchange method of the present invention may be applied in a combined "crank-fire" cycle for cranking and firing the engine during stop-start operation using the compressed air stored in the external pressurised air reservoir 36. In this case, the opening and closing timings of the first and second intake valves are altered in such a way as to isolate the engine cylinder from the ambient air supply by not opening the first intake valve 14 at all (valve de-activation), whilst the second intake valve 12 is opened and closed normally during the intake period of the engine cycle with the second intake port 22 also connected to the external pressurised air reservoir 36 by opening the timed on/off valve 34. During the above crank-fire cycle, the non-return valve 32 in the second intake port 22 will remain shut because of the air pressure from the external air reservoir 36 and compressed air will enter the cylinder 10 during the intake period and at the same time drive downwards the piston 20 at high pressure thus producing motoring power for cranking the engine. The same air is then compressed in the immediately following compression period and fired with fuel thus producing further combustion power. This would accelerate the engine very rapidly with two torque pulses in the same cycle. A production-proven valve de-activation system acting on the first intake valve 14 may be used to achieve this as illustrated in FIG. 2d.

By connecting a whole bank of engine cylinders to the external pressurised air reservoir 36 according to the above method, the crank-fire cycle will automatically synchronise with the firing sequence of the cylinders, rotating the crankshaft and re-starting the engine instantaneously within just one or two crankshaft revolutions. Once the engine has started, the compressed air from the external air reservoir 36 is switched off and the engine will transition smoothly and naturally to the normal firing mode with the non-return valve 32 in the second intake port 22 now opening automatically for drawing ambient air through the port 22 in the subsequent cycles, followed by re-activation the first intake valve 14. Thus the crank-fire cycle according to internal gas transfer method of the present invention is a very effective process for stop-start operation in an air hybrid engine.

The above crank-fire cycle may also be used, during driving, acceleration and quick launch of a vehicle, to supercharge the engine with very high boost of many bars compressed air pressure, albeit for only a brief period of time, producing very high torque in excess of the instantaneous torque normally expected from boosting by a turbocharger, thus eliminating the response delay and exhaust smoke problems caused by turbo-lag.

Figure 2A:
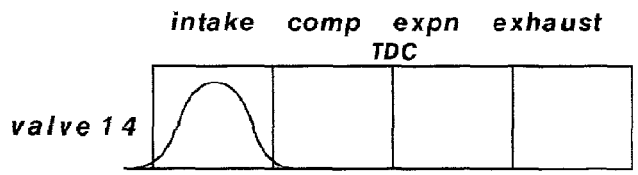
FIGS. 2a, 2b, 2c, 2d show intake valve timing diagrams of several ways of applying the internal gas transfer method of the present invention using production-proven variable valve actuation systems to achieve extra functionality for the engine.
Figure 2B:
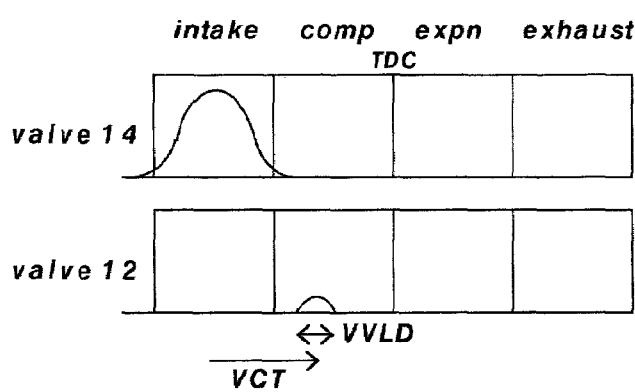
Figure 2C:
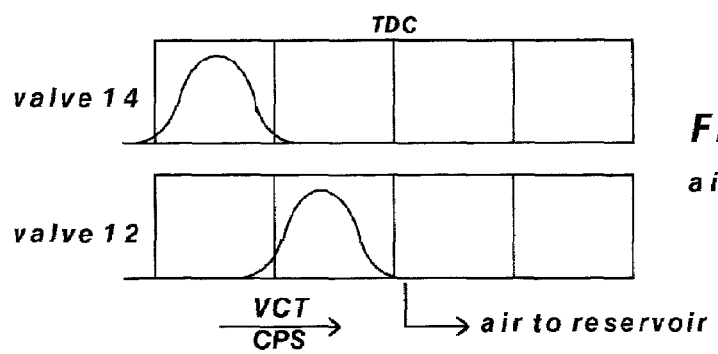
Figure 2D:
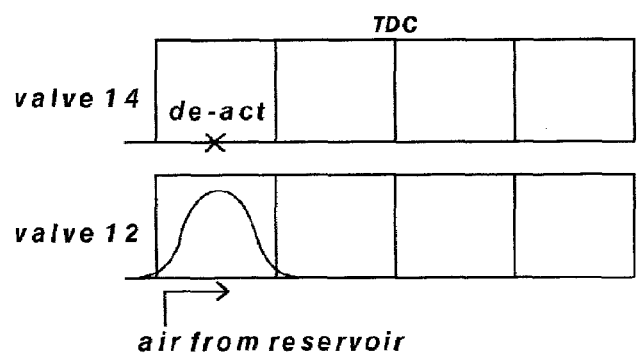

Of course, the engine may at any time be switched to operate with two through-flow intake ports 24, 22 for maximum volumetric efficiency in the firing mode by moving the opening and closing timings of both the first and second intake valves 14, 12 to the ambient air intake period of the engine cycle as illustrated in FIG. 2a.

In the above examples, production-proven VCT, VVLD, CPS or de-act hardware are used to achieve extra functionality of variable compression ratio, HCCI/CAI combustion control, and air hybrid operation. This would make the internal gas exchange method of the present invention highly practical, requiring relatively small development effort to realise the potential.

On the other hand, when more advanced electromagnetic or electro-hydraulic valve actuators become available, the method may be used with even more sophistication. For example, the second intake valve 12 may be opened and closed twice in each engine cycle, once during the ambient air intake period, and again after the cylinder 10 is isolated from the ambient air supply, thus combining the valve functions of FIGS. 2a and 2b for full volumetric efficiency and variable compression ratio, and combining the valve functions of FIGS. 2a and 2c for full volumetric efficiency and compressor mode.

The invention claimed is:

1. A method of operating an internal combustion engine having
    an engine cylinder with a reciprocating piston,
    first and second intake ports for admitting gas from an ambient air supply into the engine cylinder,
    first and second intake valves each arranged between a respective one of the intake ports and the engine cylinder,
    a non-return valve arranged in the second of the intake ports at a distance from the second intake valve and oriented to allow gas to flow only towards the engine cylinder, and
    a variable valve actuating system for controlling the opening and closing of at least the second intake valve,
    wherein, in at least one operating mode of the engine, the second intake valve is opened and closed, while the cylinder is fully isolated from the ambient air, to permit gas transfer between the cylinder and an auxiliary chamber temporarily defined by the part of the second intake port lying between the second intake valve and the non-return valve, the second intake valve being opened at a time when the pressure in the auxiliary chamber is greater than the pressure of the ambient air supply such that no gas escapes past the non-return valve.

2. A method as claimed in claim 1, wherein the engine has a variable compression ratio operating mode which comprises opening and closing the second intake valve after the beginning of the compression period of the engine cycle to trap a variable fraction of the compressed charge in the auxiliary chamber in order to vary the effective compression ratio of the engine.

3. A method as claimed in claim 2, wherein the effective compression ratio of the engine is controlled to vary the compression temperature of the cylinder charge in order to achieve CAI/HCCI combustion and influence the auto-ignition timing.

4. A method as claimed in claim 1, wherein the engine has an operating mode in which it serves to store compressed air in a reservoir connected by a selectively operable valve to the auxiliary chamber, in which mode no fuel is supplied to the cylinder, the second intake valve is opened and closed during the compression period to store a compressed mass of air within the auxiliary chamber and the selectively operable valve is subsequently opened to transfer compressed air from the auxiliary chamber to the reservoir.

5. A method as claimed in claim 4, wherein the engine has a mode of operation in which compressed air from the reservoir is employed to drive the engine, in which the selectively operable valve is opened to pressurise the auxiliary chamber and the second intake valve is subsequently opened during a period in which the piston is moving towards bottom dead centre.

6. A method as claimed in claim 5, in which the intake valve is opened during an intake period of the engine combustion cycle to drive and supercharge the engine cylinder, the intake period being followed by a compression period and charge combustion.

7. A method as claimed in claim 5, wherein the engine has a mode of operation in which it functions as a compressed air motor driven solely by compressed air from the reservoir, in which mode the second intake valve is opened and closed during at least one of the intake and the expansion period and no fuel is supplied to the engine.

8. A method as claimed in claim 1, when applied to an engine having a cam operated variable valve actuating system employing one or more of variable valve lift and duration (VVLD), variable camshaft timing (VCT), cam profile switching (CPS) and valve de-activation.

9. A method as claimed in claim 1, wherein the engine has an electrically and/or hydraulically operated valve actuating system and a variable compression ratio operating mode in which mode the second intake valve is opened and closed twice in each engine cycle, once during the intake period, and again in a period after the beginning of the compression period.

10. A method as claimed in claim 1, wherein the engine has an electrically and/or hydraulically operated valve actuating system and an operating mode in which the engine serves to compress air in a reservoir connected by a selectively operable valve to the auxiliary chamber, in which mode the second intake valve is opened and closed twice in each engine cycle, once during the intake period, and again in a period before the end of the compression period.

\* \* \* \* \*